(12) United States Patent
Herman

(10) Patent No.: US 11,351,917 B2
(45) Date of Patent: Jun. 7, 2022

(54) VEHICLE-RENDERING GENERATION FOR VEHICLE DISPLAY BASED ON SHORT-RANGE COMMUNICATION

(71) Applicant: Ford Global Technologies, LLC, Dearborn, MI (US)

(72) Inventor: David Michael Herman, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 16/275,230

(22) Filed: Feb. 13, 2019

(65) Prior Publication Data

US 2020/0254931 A1  Aug. 13, 2020

(51) Int. Cl.
*B60R 1/00* (2022.01)
*H04W 4/40* (2018.01)
(Continued)

(52) U.S. Cl.
CPC .............. *B60R 1/00* (2013.01); *G06K 9/6289* (2013.01); *G06V 20/56* (2022.01);
(Continued)

(58) Field of Classification Search
CPC ................ B60R 1/00; B60R 2300/806; B60R 2300/105; B60R 2300/30;
(Continued)

(56) References Cited

U.S. PATENT DOCUMENTS

| 5,617,490 A | 4/1997 | Kume |
| 5,717,390 A | 2/1998 | Hasselbring |

(Continued)

FOREIGN PATENT DOCUMENTS

| CN | 106683139 A | 5/2017 |
| CN | 107226087 A | 10/2017 |

(Continued)

OTHER PUBLICATIONS

Badrinarayanan, Vijay et al., SegNet: A Deep Convolutional Encoder-Decoder Architecture for Image Segmentation, Oct. 2016, 14 pages.

(Continued)

*Primary Examiner* — James J Lee
*Assistant Examiner* — Steven Vu Nguyen
(74) *Attorney, Agent, or Firm* — Frank Lollo; Eversheds Sutherland (US) LLP

(57) ABSTRACT

Method and apparatus are disclosed for vehicle-rendering generation for vehicle display based on short-range communication. An example vehicle includes a communication module configured to wirelessly communicate with remote sensing devices, a display configured to present a vehicle rendering of the vehicle, and a controller. The controller is configured to, in response to detecting an activation event, collect sensing data via the communication module. The controller also is configured to determine whether an object is coupled to the vehicle based on the sensing data and, in response to detecting an object coupled to the vehicle, modify the vehicle rendering to include an object rendering of the object.

19 Claims, 7 Drawing Sheets

(51) Int. Cl.
  *H04N 7/18* (2006.01)
  *H04N 5/232* (2006.01)
  *G06K 9/62* (2022.01)
  *G06V 20/56* (2022.01)

(52) U.S. Cl.
  CPC ......... *H04N 5/23203* (2013.01); *H04N 7/188* (2013.01); *H04W 4/40* (2018.02); *B60R 2300/105* (2013.01); *B60R 2300/30* (2013.01); *B60R 2300/607* (2013.01); *B60R 2300/806* (2013.01); *B60R 2300/8066* (2013.01)

(58) Field of Classification Search
  CPC ..... B60R 2300/607; B60R 2300/8066; H04W 4/40; H04W 4/44; H04W 4/46; H04W 4/80; G06K 9/00791; G06K 9/6289; H04N 7/188; H04N 5/23203; H04N 5/2624; H04N 5/23238
  See application file for complete search history.

(56) References Cited

U.S. PATENT DOCUMENTS

| | | |
|---|---|---|
| 6,587,597 B1 | 7/2003 | Nakao |
| 7,586,489 B2 | 9/2009 | Muller-Fischer et al. |
| 8,228,380 B2 | 7/2012 | Hardee |
| 8,473,196 B2 | 6/2013 | Basnayake |
| 8,817,101 B2 | 8/2014 | Hanisch et al. |
| 9,135,754 B2 | 9/2015 | Ng-Thow-Hing et al. |
| 9,165,219 B2 | 10/2015 | Chen |
| 9,311,818 B2 | 4/2016 | Lin |
| 9,324,201 B2 | 6/2016 | Dong |
| 9,424,725 B1 | 8/2016 | Keohane |
| 9,440,627 B2 | 9/2016 | Kurtovic |
| 9,477,894 B1 | 10/2016 | Reed |
| 9,547,912 B2 | 1/2017 | Kotz |
| 9,558,667 B2 | 1/2017 | Bowers et al. |
| 9,672,440 B2 | 6/2017 | Saward |
| 9,762,880 B2 | 9/2017 | Pflug |
| 9,784,887 B1 | 10/2017 | Ulmer |
| 9,813,619 B2 | 11/2017 | An |
| 9,928,544 B1 | 3/2018 | Hasan |
| 2002/0130953 A1 | 9/2002 | Riconda |
| 2003/0212567 A1 | 11/2003 | Shintani |
| 2008/0012940 A1* | 1/2008 | Kanaoka ............ B60R 1/00 348/148 |
| 2009/0228172 A1 | 9/2009 | Markyvech et al. |
| 2009/0231469 A1 | 9/2009 | Kato |
| 2010/0188864 A1* | 7/2010 | Raghunathan ......... B60Q 1/085 |
| 2011/0218896 A1 | 9/2011 | Tonnon |
| 2013/0103305 A1 | 4/2013 | Becker |
| 2013/0342333 A1 | 12/2013 | Hutchings |
| 2014/0324247 A1 | 10/2014 | Jun |
| 2015/0054716 A1 | 2/2015 | Hirabayashi |
| 2015/0054934 A1 | 2/2015 | Haley |
| 2015/0134675 A1 | 5/2015 | Ellis |
| 2015/0235494 A1* | 8/2015 | Creguer ............. G07C 9/00111 |
| 2016/0153778 A1 | 6/2016 | Singh |
| 2016/0325741 A1 | 11/2016 | Furst |
| 2016/0371968 A1 | 12/2016 | Almansour |
| 2017/0011378 A1 | 1/2017 | Inoue |
| 2017/0195564 A1 | 7/2017 | Appia |
| 2017/0261336 A1 | 9/2017 | Schmidt |
| 2017/0300761 A1 | 10/2017 | Chaney, Jr. |
| 2017/0341583 A1* | 11/2017 | Zhang .................. B60R 1/1003 |
| 2017/0374502 A1 | 12/2017 | Gabel |
| 2018/0001814 A1 | 1/2018 | Salter |
| 2018/0027224 A1 | 1/2018 | Javidnia |
| 2018/0032829 A1 | 2/2018 | Kim |
| 2018/0219643 A1 | 8/2018 | Naka |
| 2018/0234895 A1* | 8/2018 | Shin .................. H04W 72/1215 |
| 2018/0253899 A1* | 9/2018 | Schrepfer .......... G01C 21/3638 |
| 2018/0290594 A1 | 10/2018 | Abdel-Rahman |
| 2018/0321905 A1 | 11/2018 | Fountaine |
| 2019/0084477 A1* | 3/2019 | Gomez-Mendoza |
| 2019/0111845 A1* | 4/2019 | Karas .................. B60K 35/00 |
| 2020/0062117 A1* | 2/2020 | Ramiah .................. B60K 35/00 |
| 2020/0192362 A1* | 6/2020 | Murad ................ B62D 15/025 |
| 2020/0234676 A1* | 7/2020 | Li .......................... H04N 9/31 |

FOREIGN PATENT DOCUMENTS

| | | |
|---|---|---|
| DE | 102009031319 A1 | 1/2011 |
| DE | 102016212181 A1 | 1/2018 |
| EP | 1462762 A1 | 9/2004 |
| JP | 2005005978 A | 1/2005 |
| JP | 2005209079 A | 8/2005 |
| JP | 2017068640 A | 4/2017 |
| KR | 101760312 B1 | 7/2017 |

OTHER PUBLICATIONS

Besl, Paul J., et al., A Method for Registration of 3-D Shapes, IEEE Trans. on Pattern Analysis and Machine Intelligence, 1992, 14 (2): 239-256, IEEE Computer Society: Los Alamitos, CA, USA, 18 pages.

Brailean, James C., et al., Noise Reduction filters for dynamic image sequences: A review, Proceedings of the IEEE, 1995, 83.9: 1272-1292, 21 pages.

Buades, Antoni, et al., Multi image noise estimation and denoising, 2010, 29 pages.

Carceroni, Rodrigo, et al., Structure from motion with known camera positions, Computer Vision and Pattern Recognition, 2006, IEEE Computer Society Conference on vol. 1, 10 pages.

Chen, H., et al., 30 free-form object recognition in range images using local surface patches, 2007, Pattern Recognition Letters, vol. 28, No. 10. 4 pages.

Chen, Liang-Chi Eh et al., DeepLab: Semantic Image Segmentation with Deep Convolutional Nets, Atrous Convolution, and Fully Connected CRFs, May 2017, 14 pages.

Chwa, Dongkyoung, et al., Camera motion estimation for 3-D structure reconstruction of moving objects, 2012 IEEE International Conference on Systems, Man, and Cybernetics (SMC), 6 pages.

Crandall, David J., et al. SfM with MRFs: Discrete-Continuous Optimization for Large-Scale Structure from Motion, IEEE Transactions on Pattern Analysis & Machine Intelligence, 2013, vol. 35, No. 12, 14 pages.

Dekeyser, Fabien, et al. Restoration of noisy, blurred, undersampled image sequences using a parametric motion model, 2000, Proc. of the ISIVC, 14 pages.

Dubois, Eric et al., Noise reduction in image sequences using motion-compensated temporal filtering, 1984, IEEE transactions on communications 32. 7, 7 pages.

Eigen, David et al., Depth Map Prediction From a Single Image Using a Multi-Scale Deep Network, 2014, 9 pages.

Girdhar, Rohit et al., Learning a Predictable and Generative Vector Representation for Objects, Springer International Publishing, 2016, 26 pages.

Han, Xian-Feng et al., "A Review of Algorithms for Filtering the 30 Point Cloud," Signal Processing: Image Communication, pp. 103-112 2017, 10 pages.

Hui, Tak-Wai et al., Depth Map Super-Resolution by Deep Multi-Scale Guidance, Springer International Publishing, 2016, 17 pages.

Lin, Guosheng et al., RefineNet: Multi-Path Refinement Networks for High-Resolution Semantic Segmentation, Nov. 2016, 11 pages.

Lin, Shu-Chin et al., Filling Holes in 3D Scanned Model Base on 2D Image Inpainting, 2017, 6 pages.

Long, Jonathan et al., Fully Convolutional Networks for Semantic Segmentation, Mar. 2015, 10 pages.

Mitra, Niloy J. et al., "Estimating Swtace Normals in Noisy Point Cloud Data," International Journal of Computational Geometry & Applications, pp. 261-276, vol. 14, 2004, 16 pages.

Nilosek, David et al., Assessing geoaccuracy of structure from motion point clouds from longrange image collections, Optical Engineering, 2014, 53.11, 11 pages.

Papazov, Chavdar, et al., An efficient ransac for 3d object recognition in noisy and occluded scenes, Asian Conference on Computer Vision, 2010, Springer, Berlin, Heidelberg, 14 pages.

(56) References Cited

OTHER PUBLICATIONS

Peng Chao et al., Large Kernel Matters—Improve Semantic Segmentation by Global Convolutional Network, Mar. 2017, 11 pages.
Rosman, Guy, et al., Patch-Collaborative Spectral Point-Cloud Denoising, Computer Graphics Forum, 2013, vol. 32, No. 8, 12 pages.
Tombari, F., et al. Object recognition in 30 scenes with occlusions and clutter by Hough voting, 2010, 4th Pacific-Rim Symposium on Image and Video Technology, 7 pages.
Xiang, Yu et al., ObjectNet3D: A Large Scale Database for 3D Object Recognition, 2016, 16 pages.
Yu, Fisher et al., Multi-Scale Context Aggregation by Dilated Convolutions, Apr. 2016, 13 pages.
Zach, Christopher, Fast and High Quality Fusion of Depth Maps, 2008, 8 pages.
Zhang, Yiwei et al., A Fast 3D Reconstruction System With a Low-Cost Camera Accessory, 2015, 7 pages.
Zhao, Hengshuang et al., Pyramid Scene Parsing Network, Apr. 2017, 11 pages.
Zhu, Zhuotun et al., Deep Learning Representation using Autoencoder for 3D Shape Retrieval, 2016, 6 pages.
Brostow, Gabriel J., *Segmentation and Recognition using Structure from Motion Point Clouds*, 2008, 14 pages.
Finlayson, Graham, *Detecting Illumination in Images*, 2007, 8 pages.
Izadi, Shahram, *KinectFusion: Real-Time 3D Reconstruction and Interaction Using a Moving Depth Camera*, 2011, 10 pages.
Laskowski, Maciej, *Detection of Light Sources in Digital Photographs*, 2007, 6 pages.
Marton, Zoltan Csaba, *On Fast Surface Reconstruction Methods for Large and Noisy Point Clouds*, 2009, 6 pages.
Nguyen, Anh, *3D Point Cloud Segmentation: A Survey*, 2013, 6 pages.
Pauly, Mark, *Efficient Simplification of Point-Sampled Surfaces*, 2002, 8 pages.
Remondino, Fabio, From Point Cloud to Surface: The Modeling and Visualization Problem, 2003, 11 pages.

\* cited by examiner

VEHICLE-RENDERING GENERATION FOR VEHICLE DISPLAY BASED ON SHORT-RANGE COMMUNICATION

TECHNICAL FIELD

The present disclosure generally relates to vehicle displays and, more specifically, to vehicle-rendering generation for vehicle display based on short-range communication.

BACKGROUND

Oftentimes, vehicles include a plurality of cameras that capture images of a surrounding area. In some instances, vehicle cameras capture images of a surrounding area to facilitate control (e.g., manual, autonomous, and/or semi-autonomous control) of motive functions of a vehicle. For instance, vehicle cameras may facilitate a vehicle in performing autonomous and/or semi-autonomous motive functions, such as adaptive cruise control, lane-assist blind-spot detection, etc. Some vehicles include a display that presents images captured by a vehicle camera to a vehicle operator. For instance, images captured by a rearview camera may be presented when the vehicle is in reverse. Further, in some instances, images captured by a plurality of cameras of a vehicle are stitched together to form a rendering of a surrounding area that is presented to an operator via a display. In such instances, a predefined rendering of the vehicle is overlaid onto the stitched-together rendering of the surrounding area.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle-rendering generation for vehicle display based on short-range communication. An example disclosed vehicle includes a communication module configured to wirelessly communicate with remote sensing devices, a display configured to present a vehicle rendering of the vehicle, and a controller. The controller is configured to, in response to detecting an activation event, collect sensing data via the communication module. The controller also is configured to determine whether an object is coupled to the vehicle based on the sensing data and, in response to detecting an object coupled to the vehicle, modify the vehicle rendering to include an object rendering of the object.

In some examples, the communication module is a dedicated short-range communication (DSRC) module. In some examples, the communication module is configured to collect the sensing data via vehicle-to-vehicle (V2V) communication. In some examples, the communication module is configured to collect the sensing data via vehicle-to-infrastructure (V2I) communication. In some examples, the sensing data collected via the communication module includes an image captured by a camera. In some examples, in response to detecting the activation event, the controller is configured to cause the communication module to transmit a request for the sensing data.

In some examples, the display is configured to present at least one of a bird's-eye, a side view, and an isometric view of the vehicle rendering.

In some examples, the activation event includes activation of at least one of an engine and a motor of the vehicle. Some examples further include a camera. In such examples, the activation event includes activation of the camera. In some such examples, the display is a touchscreen and the controller activates the camera in response to receiving a request via the touchscreen. In some such examples, the camera is a rearview camera and the controller activates the rearview camera in response to detecting that a transmission of the vehicle is in reverse. In some examples, the activation event includes a passive-entry passive-start (PEPS) event. Some examples further include an autonomy unit configured for park-assist. In such examples, the activation event includes a park-assist event.

In some examples, the controller is configured to fuse the sensing data collected from a plurality of remote sensing devices and determine whether an object is coupled to the vehicle based on the fused sensing data. In some examples, the controller configured to detect a lighting condition based on the sensing data and modify the vehicle rendering based on the lighting condition. In some examples, communication between the communication module and a remote sensing device includes location data. In such examples, the controller is configured to identify a location of the vehicle within the sensing data based on the location data.

In some examples, the object rendering includes a three-dimensional rendering and the controller is configured to generate the object rendering utilizing the sensing data. Some examples further include an onboard database of renderings. In such examples, the controller is configured to retrieve the object rendering from the onboard database upon identifying the object based on the sensing data. Some such examples further include a second communication module configured to communicate with a remote server. In such examples, the controller is configured to retrieve the object rendering from the remote server via the second communication module in response to determining that the onboard database does not include the object rendering.

Another example disclosed method for a vehicle includes detecting, via a processor, an activation event. The example disclosed method also includes, in response to detecting the activation event, generating a vehicle rendering of the vehicle and collecting sensing data from one or more remote sensing devices via a communication module. The example disclosed method also includes determining, via the processor, whether an object is coupled to the vehicle based on the sensing data and, in response to detecting an object coupled to the vehicle, modifying the vehicle rendering to include an object rendering of the object. The example disclosed method also includes presenting the vehicle rendering via a display of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
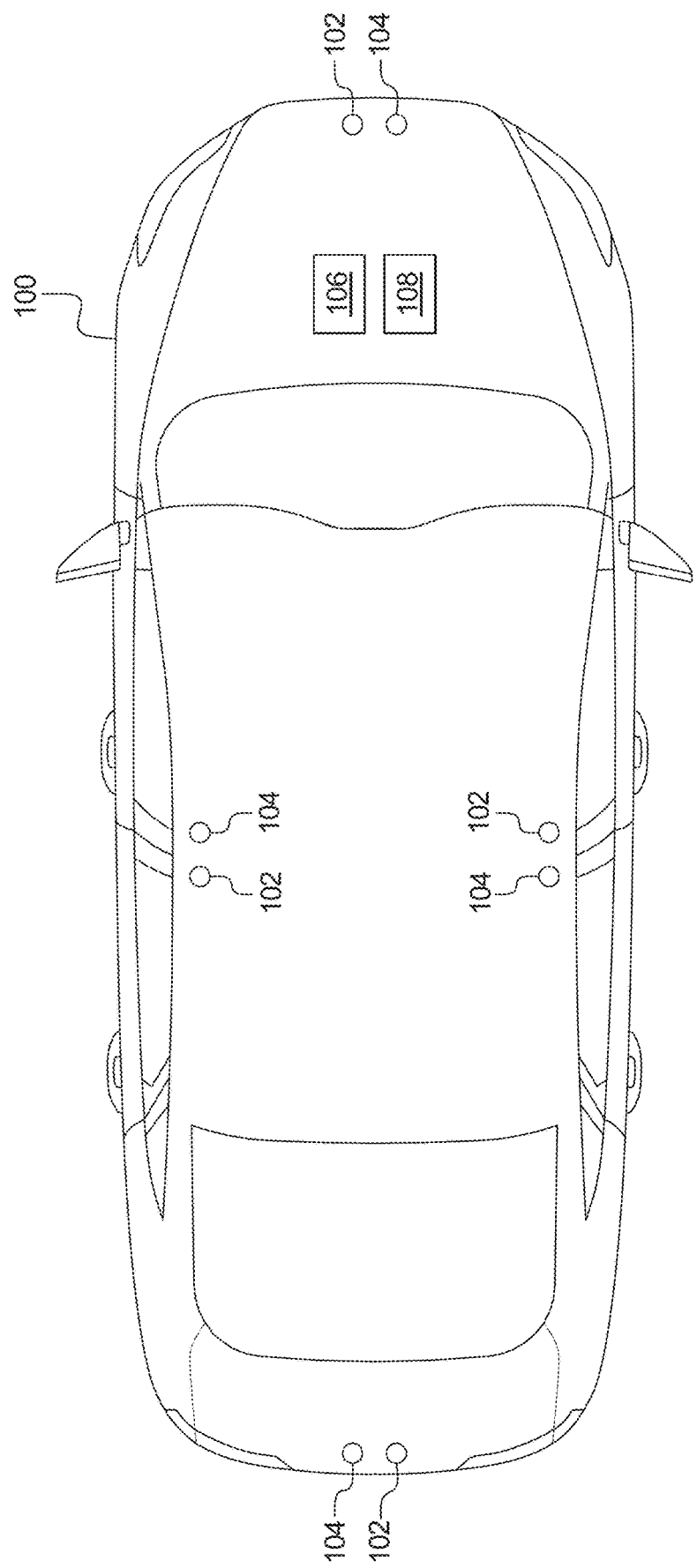
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include a plurality of cameras that capture images of a surrounding area. In some instances, vehicle cameras capture images of a surrounding area to facilitate a vehicle in performing autonomous and/or semi-autonomous motive functions, such as adaptive cruise control, lane-assist blind-spot detection, etc. Some vehicles include a display that presents images captured by a vehicle camera to a vehicle operator. For instance, images captured by a rearview camera may be presented when the vehicle is in reverse.

Further, in some instances, images captured by a plurality of cameras of a vehicle are stitched together to form a rendering of a surrounding area that is presented to an operator via a display. In such instances, a predefined rendering of the vehicle is overlaid onto the stitched-together rendering of the surrounding area. For instance, the rendering of the surrounding area may be overlaid with a predefined rendering of the vehicle to facilitate a vehicle operator on observing objects adjacent to the vehicle. Oftentimes, the predefined rendering of the vehicle does not match certain characteristics of the vehicle. For instance, the predefined rendering may be a different color than that of the actual vehicle. Further, because the rendering of the vehicle is predefined, the rendering does not reflect objects that the operator has placed on and/or otherwise coupled to the vehicle (e.g., a bicycle, a kayak, a trailer, a Christmas tree, a Hanukiah, objects placed in a flatbed of a truck, a decal, etc.). In turn, the operator may potentially be confused by the rendering of the vehicle that does not match the actual characteristics of the vehicle.

Example methods and apparatus disclosed herein utilize communication with nearby sensing devices (e.g., vehicles, roadside units, drones, mobile devices, trailers, etc.) to generate an accurate rendering of a vehicle and/or an object coupled to the vehicle to facilitate a vehicle operator in safely navigating the vehicle and/or for aesthetic purposes. Examples disclosed herein include a vehicle system for generating an accurate bird's-eye view, side view, and/or isometric view rendering of the vehicle. The vehicle system monitoring for an activation event. Example activation events include (i) a key-on event, (ii) activation of a surround-view camera feature of the vehicle, and/or (iii) detection of a user approaching the vehicle. Upon detecting an activation event, the vehicle system collects imaging data from nearby sensing devices via vehicle-to-everything (V2X) communication. The vehicle system utilizes image recognition to determine whether an object is coupled to the vehicle. If the vehicle system identifies an object coupled to the vehicle, the vehicle system generates a rendering of the vehicle that includes the object coupled to the vehicle. The vehicle system presents the rendering via a display of the vehicle to facilitate an operator and/or an autonomy unit in safely navigating the vehicle and/or for aesthetic purposes.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes a plurality of range-detection sensors. As used herein, a "range-detection sensor" refers to an electronic device that is configured to collect information to detect a presence of and distance to nearby object(s). In the illustrated example, the range-detection sensors of the vehicle 100 include proximity sensors 102 and cameras 104. The proximity sensors 102 are configured to detect the presence, proximity, and/or location of object(s) near the vehicle 100. For example, the proximity sensors 102 include radar sensor(s), lidar sensor(s), ultrasonic sensor(s), and/or any other sensor configured to detect the presence, proximity, and/or location of nearby object(s). A radar sensor detects and locates an object via radio waves, a lidar sensor detects and locates the object via lasers, and an ultrasonic sensor detects and locates the object via ultrasound waves. Further, the cameras 104 are configured to capture image(s) and/or video of a surrounding area of the vehicle 100 to enable nearby object(s) to be identified and located. In the illustrated example, the range-detection sensors (e.g., the proximity sensors 102, the cameras 104) are located on each side of the vehicle 100 (e.g., front, rear, left, right) to enable the range-detection sensors in monitoring each portion of the surrounding area of the vehicle 100. Additionally or alternatively, the range-detection sensors may be positioned at other location(s) of the vehicle 100 that enable the range-detection sensors to monitor the surrounding area of the vehicle 100.

The vehicle 100 of the illustrated example also includes a communication module 106 that is configured to communicate with other nearby communication devices (e.g., remote sensing devices). In the illustrated example, the communication module 106 includes a dedicated short-range communication (DSRC) module. A DSRC module includes antenna(s), radio(s) and software to communicate with nearby vehicle(s) via vehicle-to-vehicle (V2V) communication, infrastructure-based module(s) via vehicle-to-infrastructure (V2I) communication, and/more, more generally, nearby communication device(s) (e.g., a mobile device-based module) via vehicle-to-everything (V2X) communication.

More information on the DSRC network and how the network may communicate with vehicle hardware and software is available in the U.S. Department of Transportation's Core June 2011 System Requirements Specification (SyRS) report (available at http://www.its.dot.gov/meetings/pdf/

CoreSystem/SE/SyRS/RevA%20(Jun. 13, 2011).pdf) which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

Additionally or alternatively, the communication module 106 includes a cellular vehicle-to-everything (C-V2X) module. AC-V2X module include hardware and software to communicate with other vehicle(s) via V2V communication, infrastructure-based module(s) via V2I communication, and/or, more generally, nearby communication devices (e.g., mobile device-based modules) via V2X communication. For example, a C-V2X module is configured to communicate with nearby devices (e.g., vehicles, roadside units, drones, mobile devices, etc.) directly and/or via cellular networks. Currently, standards related to C-V2X communication is being developed by the 3rd Generation Partnership Project.

Figure 2:
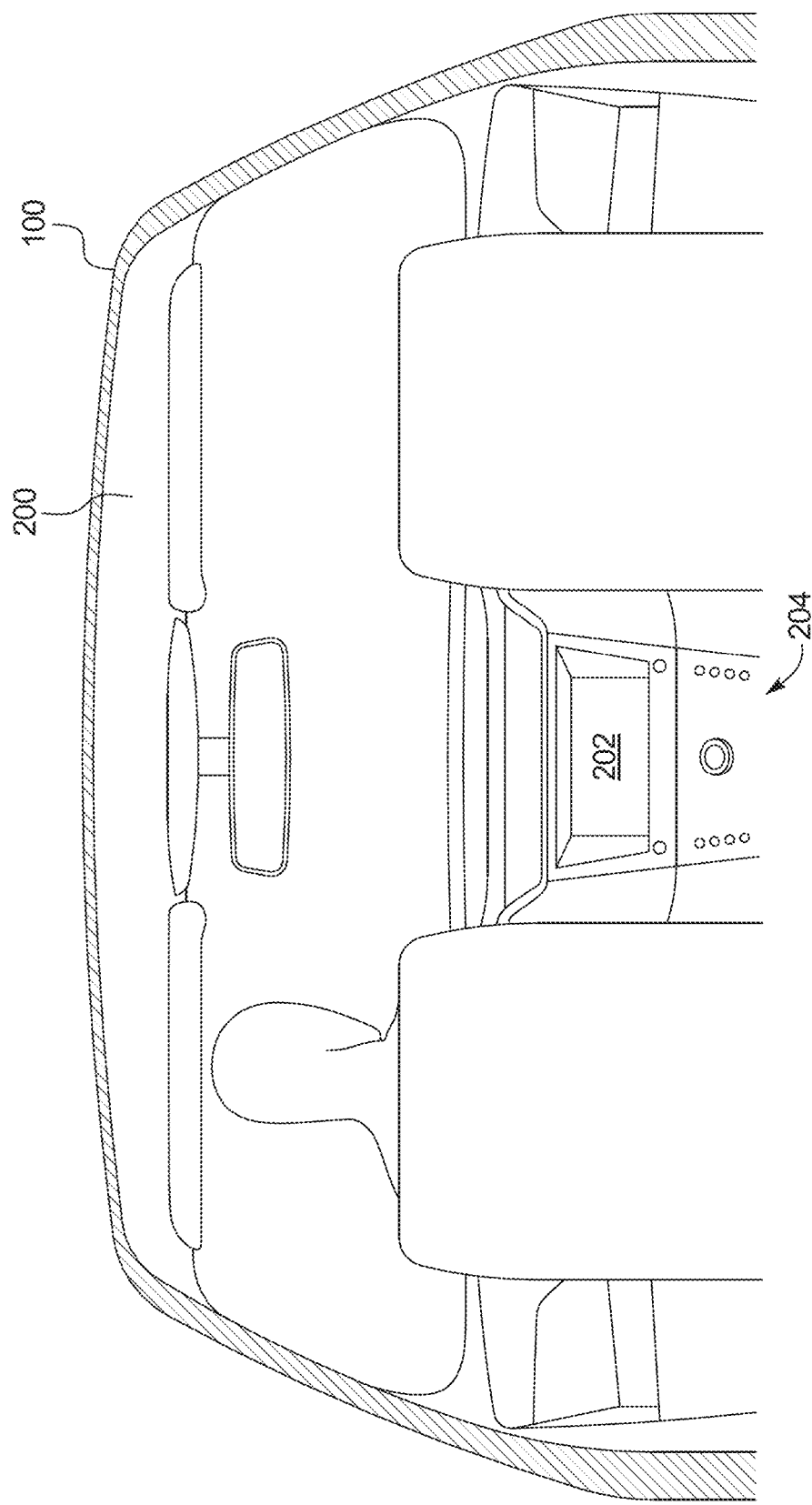
FIG. 2 illustrates a cabin of the vehicle of FIG. 1.

The vehicle 100 of the illustrated example also includes a rendering controller 108 configured to (1) generate a rendering of the vehicle 100 and/or any object(s) coupled to the vehicle (e.g., a bicycle 306 of FIGS. 3 and 4) and (2) present the rendering to an operator via a vehicle display (e.g., a display 202 of FIG. 2). In some examples, the rendering of the vehicle 100 may be predefined factory-installed rendering stored within an onboard database (e.g., a database 520 of FIG. 5). In such examples, the rendering controller 108 is configured to modify the factory-installed rendering to include an object that is coupled to the vehicle 100.

To modify the vehicle rendering to include an object rendering of an object coupled to the vehicle 100, the rendering controller 108 is configured to monitor for an activation event. For example, an activation event includes (i) a key-on event, (ii) activation of an engine or motor of the vehicle 100, (iii) receipt of a request via a touchscreen (e.g., a display 202 of FIG. 2) and/or other input device of the vehicle 100, (iv) a transmission of the vehicle 100 being placed in reverse, (v) activation of one or more of the cameras 104 of the vehicle 100 (e.g., activation of a rearview camera in response to a transmission of the vehicle 100 being placed in reverse), (vi) a passive-entry passive-start event, (vii) a park-assist event performed by an autonomy unit of the vehicle (e.g., an autonomy unit 528 of FIG. 5), etc.

As used herein, "passive entry" and "passive-entry" refer to a system of a vehicle that unlock(s) and/or open(s) one or more doors of the vehicle upon detecting that a key fob and/or phone-as-a-key is proximate to a door of the vehicle. Some passive entry systems trigger a door for opening in response to detecting that a key fob and/or phone-as-a-key is approaching and/or within a predetermined range of the vehicle. In such examples, the door is unlocked in response to detecting that (1) a user has touched a handle of the door and (2) the key fob and/or phone-as-a-key is proximate to the door when the handle is touched. As used herein, "passive start" and "passive-start" refer to a system of a vehicle that activates ignition of an engine of the vehicle upon detecting that a key fob and/or phone-as-a-key is within a cabin of the vehicle (e.g., such that drive-away is enabled). Some passive start systems trigger an engine for ignition in response to detecting that a key fob and/or phone-as-a-key is approaching and/or within a predetermined range of the vehicle. In such examples, the engine is started in response to detecting that (1) a user has engaged an ignition switch of the vehicle and (2) the key fob and/or phone-as-a-key is within the cabin when the ignition switch is engaged. As used herein, "passive entry passive start," "passive-entry passive-start" and a "PEPS" refer to a system of vehicle that is configured to perform passive entry and passive start for the vehicle.

As used herein, "vehicle park-assist" and "park-assist" refer to a system in which a vehicle controls its motive functions, without direct steering or velocity input from an operator (e.g., a driver), to autonomously park within a parking spot. For example, an autonomy unit of a park-assist system controls the motive functions of the vehicle upon receiving an initiation signal from the operator. As used herein, "remote parking," "vehicle remote park-assist," "remote park-assist," and "RePA" refer to a system in which a vehicle controls its motive functions, without direct steering or velocity input from an operator (e.g., a driver), to autonomously park within a parking spot while the operator is located outside of the vehicle. For example, an autonomy unit of a remote park-assist system controls the motive functions of the vehicle upon receiving a remote initiation signal from a mobile device of the operator.

Upon detecting an activation event, the rendering controller 108 is configured to cause the communication module 106 to transmit a request for sensing data from remote sensing device(s) adjacent to the vehicle 100. For example, the remote sensing device(s) include other vehicle(s) (e.g., a vehicles 304 of FIG. 3), roadside unit(s) (e.g., a roadside unit 308 of FIG. 3), mobile device(s) (e.g., a smart phone, a wearable, a smart watch, a tablet, etc.), and/or other device (s) (e.g., drones, sensing unit(s) of a trailer coupled to the vehicle 100, etc.). A remote sensing device includes (i) one or more range-detection sensors (e.g., a proximity sensor, a camera, etc.) configured to collect data that identifies nearby object(s) and (ii) a communication module configured for short-range communication. For example, the sensing data collected by a remote sensing device includes image(s) collected by camera(s) and/or other data collected by radar sensor(s), lidar sensor(s), ultrasonic sensor(s), etc. In response to the communication module of the remote sensing device receiving the request for sensing data from the communication module 106 of the vehicle 100, the communication module of the remote sensing device is configured to transmit the sensing data collected by the sensors of the remote sensing device.

The rendering controller 108 of the vehicle 100 is configured to collect the sensing data from the remote sensing device(s) via the communication module 106. That is, in response to detecting an activation event, the rendering controller 108 is configured to collect sensing data from remote sensing device(s) upon transmitting a corresponding request via the communication module 106. For example, the communication module 106 is configured to collect the remote sensing data from an adjacent vehicle (e.g., one or more of vehicles 304 of FIG. 3) via V2V communication and/or from an adjacent roadside unit (e.g., a roadside unit 308 of FIG. 3) via V2I communication. In some examples, the collected sensing data is filtered and/or supplemented based on other data. For example, the sensing data is filtered based on the data collected by the range-detection sensors of the vehicle 100 and/or based on high-definition (HD) maps of a surrounding area of the vehicle 100.

In some examples, the rendering controller 108 is configured to fuse the sensing data collected from a plurality of remote sensing devices. For example, the rendering controller 108 is configured to fuse image data collected from camera(s) with lidar data collected from lidar sensors and/or other target vehicle data utilizing motion or visual slam techniques. Additionally or alternatively, the rendering controller 108 is configured to merge three-dimensional point clouds from multiple lidar scans utilizing V2X localization and/or other techniques (e.g., RANSAC, persistent feature histograms, etc.). Further, in some examples, the rendering controller 108 is configured to fuse three-dimensional data of three-dimensional point clouds with image and three-dimensional object detection to generate a labeled map of the surrounding area of the vehicle 100.

Further, the rendering controller 108 is configured to generate a rendering of the vehicle 100 and its surrounding area based on the collected data. For example, the rendering controller 108 is configured to stitch the collected images and/or other collected sensing data together into a bird's-eye view, a side view, an isometric view, and/or another view of the vehicle 100 within its surrounding area. For example, the rendering controller 108 is configured to utilize image stitching software to identify object(s) within each of the collected images, match object(s) that are within a plurality of the collected images, calibrate the collected images with respect to each other, and blend the calibrated images together to generate a view of the vehicle 100 within its surrounding area.

The rendering controller 108 also is configured to determine whether an object is coupled to the vehicle 100 based on the sensing data. For example, the rendering controller 108 is configured to utilize image recognition to identify the vehicle 100 within the sensing data and/or the image rendered based on the sensing data. For example, the rendering controller 108 may segment images to detect the vehicle 100 and/or other objects within a collected and/or stitched image. Additionally or alternatively, the rendering controller 108 may segment generated point clouds to detect the vehicle 100 and/or other objects within the generated point cloud. Further, in some examples, the communication collected by the communication module 106 of the vehicle 100 from the remote sensing device(s) includes location data. The rendering controller 108 is configured to utilize the location data to identify a location of the vehicle 100 within the sensing data and/or the image rendered based on the sensing data. In some examples, an object that is coupled to the vehicle 100 is a two-dimensional object (e.g., a sticker, a decal, etc.). In other examples, an object that is coupled to the vehicle 100 is a three-dimensional object (e.g., a bicycle, a rack, a trailer, a kayak, a Christmas tree, a Hanukiah, objects placed in a flatbed of a truck, etc.).

In response to detecting that an object is coupled to the vehicle, the rendering controller 108 is configured to modify the vehicle rendering to include an object rendering of the detected object to facilitate a vehicle operator in safely navigating the vehicle and/or for aesthetic purposes. In some examples, the rendering controller 108 is able to generate a three-dimensional rendering of the object coupled to the vehicle 100 based on the collected sensing data. For example, the rendering controller 108 is configured to generate a three-dimensional rendering of the object based on stitched-together image(s) and/or a three-dimensional map of the surrounding area that is generated based on the collected sensing data. If the rendering controller 108 is able to generate a rendering of the object, the rendering controller 108 generates the object rendering of the object (e.g., a three-dimensional rendering) utilizing the collected sensing data. For example, the rendering controller 108 generates the object rendering to match the shape, dimensions, colors, and/or other characteristics of the object coupled to the vehicle 100. If the rendering controller 108 is able to generate a rendering of the object (e.g., due to an incomplete mapping of the object), the rendering controller 108 is configured to identify the object and retrieve a rendering of the identified object. For example, if the rendering controller 108 identifies that a kayak is coupled to the vehicle 100, the rendering controller 108 retrieves a rendering of a kayak from a database onboard the vehicle 100 (e.g., a database 520 of FIG. 5) and/or from a remote serer via a communication module (e.g., a communication module 508 of FIG. 5). Further, in some examples, the rendering controller 108 is configured to (i) identify color(s) from one side of an object based on an image collected from one perspective of the object and (ii) propagate the identified color(s) to other sides of the object.

Additionally or alternatively, the rendering controller 108 is configured to modify the vehicle rendering based on lighting and/or other conditions (e.g., a direction of light, a color temperature, intensity/color histogram, white balance, hue, color balance, etc.) detected based on the collected sensing data. For example, the rendering controller 108 lightens the vehicle rendering in daylight and darkens the vehicle rendering at night to further facilitate the vehicle operator in safely navigating the vehicle and/or for aesthetic purposes.

Upon modifying the vehicle rendering of the vehicle 100 to include an object rendering of an object coupled to the vehicle 100, the vehicle rendering is overlaid onto a rendering of the surrounding area of the vehicle 100. Further, a display of the vehicle 100 (e.g., a display 202 of FIG. 2) is configured to present the rendering to facilitate an operator in safely navigating the vehicle 100 and/or for aesthetic purposes. For example, the vehicle rendering presented via the display includes a bird's-eye view and/or a side view of the vehicle 100, an object coupled to the vehicle 100, and/or a surrounding area of the vehicle 100. Further, in some examples, the rendering controller 108 saves the modified vehicle rendering in memory (e.g., memory 518 of FIG. 5) and/or a database (e.g., a database 520 of FIG. 5) onboard the vehicle 100 for subsequent use. Further, in some examples, the rendering controller 108 is configured to present an image of a portion of the vehicle 100 (e.g., a roof, a side) and/or an object coupled to the vehicle 100 (e.g., a bicycle, a kayak, a trailer, a Christmas tree, a Hanukiah, objects placed in a flatbed of a truck, a decal, etc.) as captured by a remote sensing device upon performing image processing on the image to reorient the image.

FIG. 2 illustrates a cabin 200 of the vehicle 100. In the illustrated example, a display 202 and console input devices 204 are located within the cabin 200 of the vehicle 100. For example, the display 202 and the console input devices 204 are located on a dashboard, a center console, and/or another console of the vehicle 100 that is adjacent to a driver's seat within the cabin 200 to facilitate a vehicle operator (e.g., a driver) in utilizing the display 202 and the console input devices 204.

In the illustrated example, the console input devices 204 include input device(s), such as switches, buttons, etc., that enable the vehicle operator and/or a passenger to control various features of the vehicle 100. Further, the display 202 of the illustrated example includes a center console display, such as a liquid crystal display (LCD), an organic light emitting diode (OLED) display, a flat panel display, a solid state display, etc. Additionally or alternatively, the display 202 includes a heads-up display that is configured to project an image onto a windshield of the vehicle 100. In some examples, the display 202 is configured to present an infotainment system (such as SYNC® and MyFord Touch® by Ford®) to the vehicle operator and/or passenger(s) within the cabin 200 of the vehicle 100. Further, in the illustrated example, the display 202 is configured to present a rendering of the vehicle 100 and/or its surrounding area to facilitate the vehicle operator in steering the vehicle 100.

Figure 3:
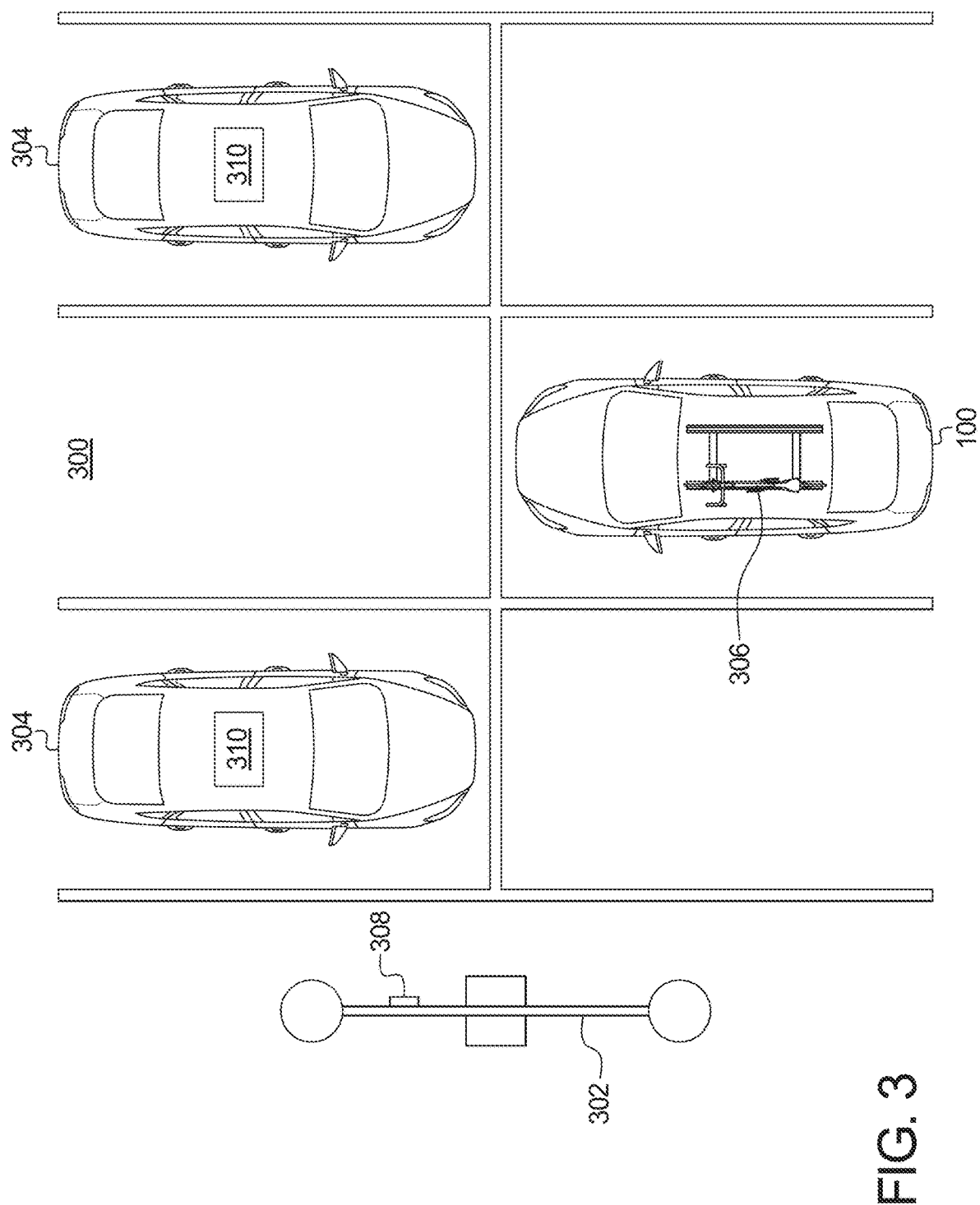
FIG. 3 depicts an environment in which short-range communication is utilized to generate a rendering of the vehicle of FIG. 1.

FIG. 3 depicts an environment in which short-range communication is utilized to modify a rendering of the vehicle 100. In the illustrated example, the vehicle 100 is located in a parking lot 300. The parking lot 300 includes a streetlamp 302 that is adjacent to the vehicle 100. Further, other vehicles 304 are located in the parking lot 300 adjacent to the vehicle 100. Additionally, in the illustrated example, a bicycle 306 is coupled to the vehicle 100.

As illustrated in FIG. 3, a roadside unit 308 is coupled to the streetlamp 302. In other examples, the roadside unit 308 may be coupled to other infrastructure, such as a stoplight, a road sign, a post, a bridge, etc. Further, the roadside unit 308 is configured to communicate via DSRC, C-V2X, and/or other short-range communication protocols. For example, the roadside unit 308 is configured to perform V2I communication with the communication module 106 of the vehicle 100 and/or communication modules of the vehicles 304. The roadside unit 308 includes hardware and software to broadcast messages and/or establish communicative connections with the vehicle 100, one or more of the vehicles 304, and/or other nearby devices (e.g., other roadside units, mobile devices, etc.). Further, the roadside unit 308 of the illustrated example includes sensing device(s). For example, the roadside unit 308 includes camera(s), lidar sensor(s), radar sensor(s), ultrasonic sensor(s), and/or any other type of range-detection sensors.

Further, as illustrated in FIG. 3, the vehicles 304 include respective communication modules 310. Each of the communication modules 310 is configured to communicate via DSRC, C-V2X, and/or other short-range communication protocols. For example, each of the communication modules 310 is configured to perform V2V communication with the communication module 106 of the vehicle 100 and/or V2I communication with the roadside unit 308. The communication modules 310 include hardware and software to broadcast messages and/or establish communicative connections with the vehicle 100, the roadside unit 308, and/or other nearby devices (e.g., other roadside units, mobile devices, etc.). Further, each of the vehicles 304 includes sensing device(s). For example, the vehicles 304 include camera(s), lidar sensor(s), radar sensor(s), ultrasonic sensor(s), and/or any other type of range-detection sensors.

In the illustrated example, the rendering controller 108 is configured to (1) collect sensing data from the roadside unit 308 and/or one or more of the vehicles 304 and (2) modify a rendering of the vehicle 100 to include a rendering of the bicycle. For example, upon detecting an activation event, the rendering controller 108 causes the communication module 106 to transmit a request to collect sensing data from nearby remote sensing devices (e.g., the vehicles 304, the roadside unit 308). Upon transmitting the request, the communication module 106 of the vehicle 100 collects sensing data from remote sensing devices (e.g., one or more of the vehicles 304, the roadside unit 308, a mobile device, a drone, sensing unit(s) of a trailer coupled to the vehicle 100, etc.) that received the request and has collected sensing data. Further, the rendering controller 108 analyzes the collected sensing data utilizing image recognition to detect that the bicycle 306 is coupled to the vehicle 100. Subsequently, the rendering controller 108 generates a rendering of the bicycle 306 and modifies the rendering of the vehicle 100 to include the rendering of the bicycle 306.

Figure 4:
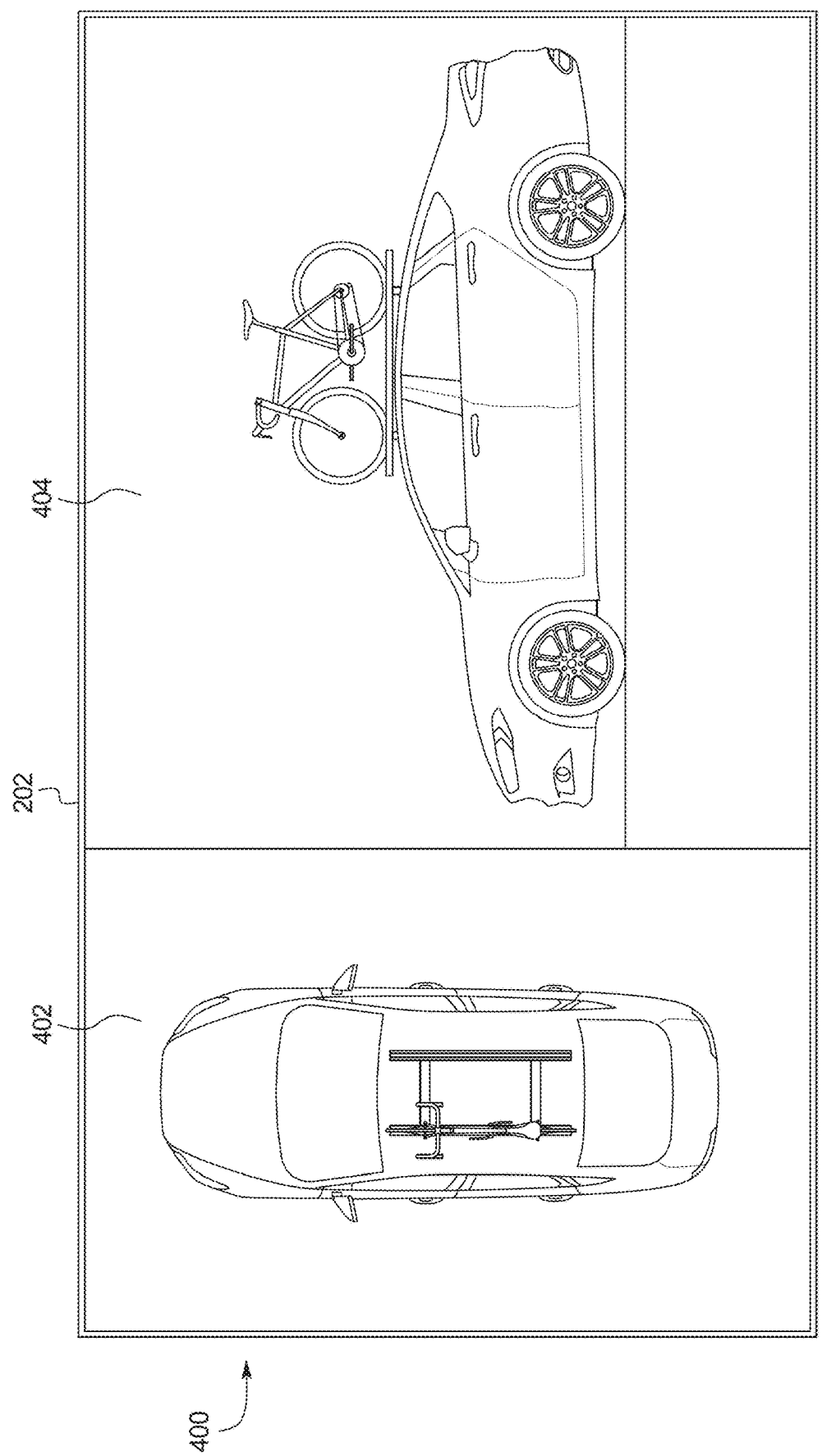
FIG. 4 depicts a display presenting a rendering of the vehicle of FIG. 1.

FIG. 4 depicts an interface 400 that is presented by the rendering controller 108 via the display 202 of the vehicle 100. As illustrated in FIG. 4, the interface 400 includes a bird's-eye view 402 of the modified rendering of the vehicle 100. That is, the bird's-eye view 402 includes a rendering of the vehicle 100, the bicycle 306, and a surrounding area of the vehicle 100. Further, the interface 400 includes a side view 404 of the modified rendering of the vehicle 100. That is, the side view 404 includes a rendering of the vehicle 100, the bicycle 306, and a surrounding area of the vehicle 100.

Figure 5:
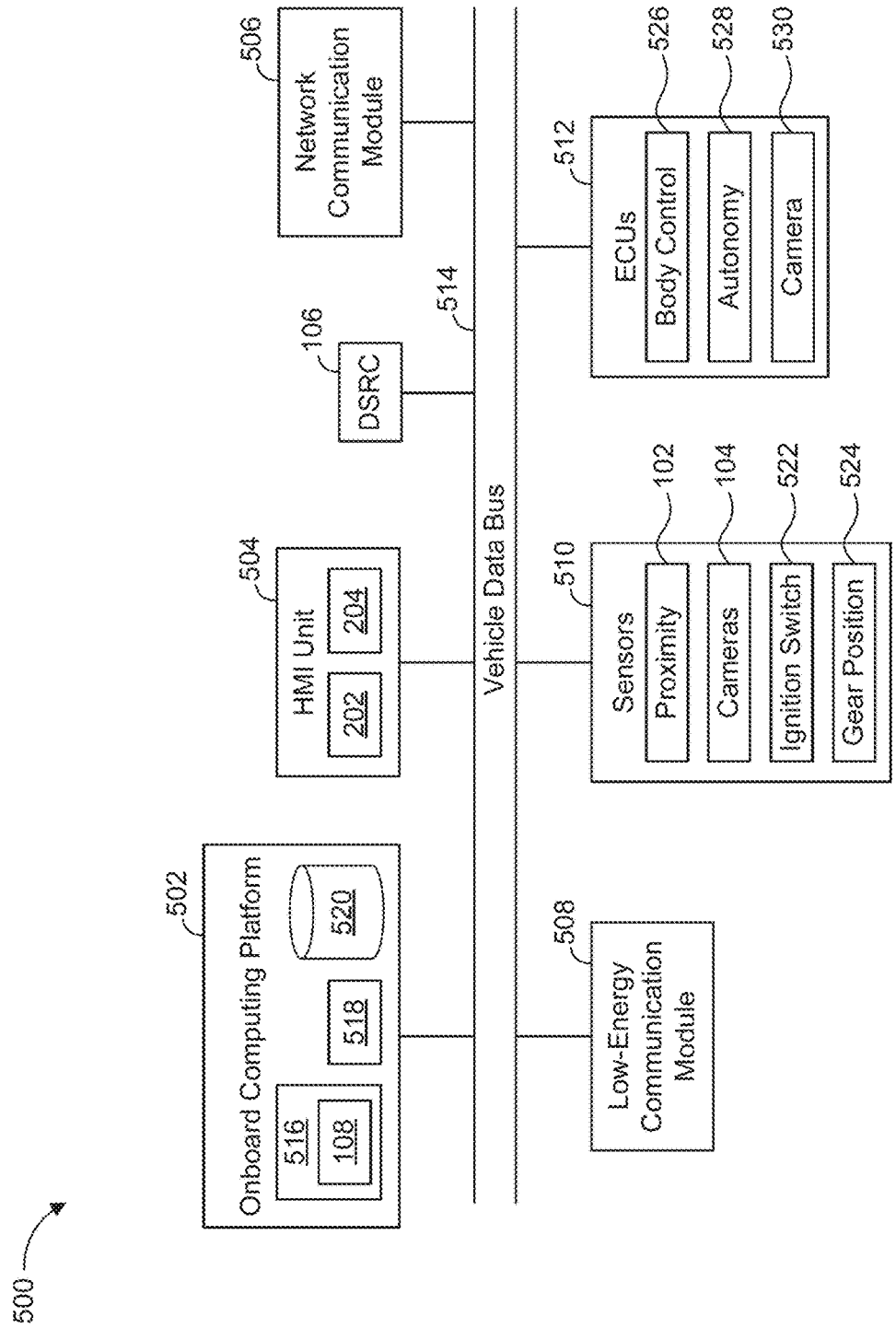
FIG. 5 is a block diagram of electronic components of the vehicle of FIG. 1.

FIG. 5 is a block diagram of electronic components 500 of the vehicle 100. As illustrated in FIG. 5, the electronic components 500 includes an onboard computing platform 502, a human-machine interface (HMI) unit 504, the communication module 106, another communication module 506, another communication module 508, sensors 510, electronic control units (ECUs) 512, and a vehicle data bus 514.

The onboard computing platform 502 includes a processor 516 (also referred to as a microcontroller unit and a controller), memory 518, and a database 520. In the illustrated example, the processor 516 of the onboard computing platform 502 is structured to include the rendering controller 108. In other examples, the rendering controller 108 is incorporated into another ECU with its own processor and memory.

The processor 516 may be any suitable processing device or set of processing devices such as, but not limited to, a microprocessor, a microcontroller-based platform, an integrated circuit, one or more field programmable gate arrays (FPGAs), one or more tensor processing units (TPUs), and/or one or more application-specific integrated circuits (ASICs). The memory 518 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 518 includes multiple kinds of memory, particularly volatile memory and non-volatile memory. The database 520 onboard the vehicle 100 is configured to store renderings of the vehicle 100 and object(s) that may be coupled to and/or otherwise near the vehicle 100. For example, the rendering controller 108 is configured to access the database to retrieve rendering(s) of the vehicle 100 and object(s) coupled to and/or otherwise near the vehicle 100.

The memory 518 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 518, the computer readable medium, and/or within the processor 516 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The HMI unit 504 provides an interface between the vehicle 100 and a user. The HMI unit 504 includes digital and/or analog interfaces (e.g., input devices and output devices) to receive input from and display information for the user(s). The input devices include the console input devices 204 and other devices, such as a control knob(s), instrument panel(s), digital camera(s) for image capture and/or visual command recognition, touchscreen(s), audio input device(s) (e.g., cabin microphone), button(s), touchpad(s), etc. The output devices include the display 202. Further, the output devices may include instrument cluster outputs (e.g., dials, lighting devices), actuators, speakers, etc.

The communication module 506 includes wired or wireless network interfaces to enable communication with external networks. The communication module 506 also includes hardware (e.g., processors, memory, storage, antenna, etc.) and software to control the wired or wireless network interfaces. In the illustrated example, the communication module 506 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.). In some examples, the communication module 506 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The communication module 508 is configured to communicate with a mobile device (e.g., a key fob, a phone-as-a-key) designated for communication with the vehicle 100 to initiate vehicle functions, such as passive entry, passive start, remote entry, remote start, remote park-assist, etc. For example, the communication module 508 are configured to localize the mobile device for initiation of one or more of the vehicle function(s). In some examples, the communication module 508 includes a processing module and one or more antenna modules for localizing the mobile device.

The antenna modules include hardware (e.g., processors, memory, storage, antenna, etc.) and software to control wireless network interface(s). For example, the antenna modules are configured for personal or local area wireless network protocols (e.g., Bluetooth®, Bluetooth® Low Energy (BLE), Zigbee®, Z-Wave®, etc.). In some examples, the antenna modules may be referred to as "BLE Antenna Modules (BLEAMs)" when the antenna modules are configured to implement BLE communication." The antenna modules communicatively couple to a mobile device and measure and/or receive measurements of the signal strength of the signals (e.g., received signal strength indicators) broadcast by the mobile device to facilitate determining a distance to and/or a location of the mobile device relative to the vehicle 100. Further, in some examples, the vehicle 100 includes one or more internal antenna modules located inside the cabin 200 to facilitate determining when the mobile device is within the cabin 200 (e.g., to enable passive start of the vehicle 100).

The processing module of the communication module 508 is communicatively coupled to the antenna modules to track a distance to and/or a location of the mobile device relative to the vehicle 100. The processing module may be referred to as a "BLE Module (BLEM)" when the antenna modules are configured to implement BLE communication. In some examples, the processing module is configured to receive and analyze the signal strength measurements (e.g., received signal strength indicators) between the antenna modules and the mobile device. Based on these measurements, the processing module determines a location of the mobile device relative to the vehicle 100 to facilitate initiation of one or more vehicle functions. For example, a passive entry function is initiated upon the processing module determining that the mobile device is near a vehicle door and/or a passive start function is initiated upon the processing module determining that the mobile device is within the cabin 200.

The sensors 510 are arranged in and/or around the vehicle 100 to monitor properties of the vehicle 100 and/or an environment in which the vehicle 100 is located. One or more of the sensors 510 may be mounted to measure properties around an exterior of the vehicle 100. Additionally or alternatively, one or more of the sensors 510 may be mounted inside a cabin of the vehicle 100 or in a body of the vehicle 100 (e.g., an engine compartment, wheel wells, etc.) to measure properties in an interior of the vehicle 100. For example, the sensors 510 include accelerometers, odometers, tachometers, pitch and yaw sensors, wheel speed sensors, microphones, tire pressure sensors, biometric sensors and/or sensors of any other suitable type.

In the illustrated example, the sensors 510 include the proximity sensors 102, the cameras 104, an ignition switch sensor 522, and a gear position sensor 524. The proximity sensors 102 are configured to detect the presence, proximity, and/or location of object(s) near the vehicle 100. The cameras 104 are configured to capture image(s) and/or video of a surrounding area of the vehicle 100 to enable nearby object(s) to be identified and located. The ignition switch sensor 522 is configured to detect a state of an engine and/or a motor of the vehicle 100. For example, ignition switch sensor 522 detects whether the engine and/or the motor is active and/or inactive. Further, the gear position sensor 524 is configured to detect in which gear a transmission of the vehicle 100 is positioned. For example, the gear position sensor 524 detects when the vehicle 100 is operating in reverse.

The ECUs 512 monitor and control the subsystems of the vehicle 100. For example, the ECUs 512 are discrete sets of electronics that include their own circuit(s) (e.g., integrated circuits, microprocessors, memory, storage, etc.) and firmware, sensors, actuators, and/or mounting hardware. The ECUs 512 communicate and exchange information via a vehicle data bus (e.g., the vehicle data bus 514). Additionally, the ECUs 512 may communicate properties (e.g., status of the ECUs 512, sensor readings, control state, error and diagnostic codes, etc.) to and/or receive requests from each other. For example, the vehicle 100 may have dozens of the ECUs 512 that are positioned in various locations around the vehicle 100 and are communicatively coupled by the vehicle data bus 514.

In the illustrated example, the ECUs 512 include a body control module 526, an autonomy unit 528, and a camera module 530. The body control module 526 controls one or more subsystems throughout the vehicle 100, such as power windows, power locks, an immobilizer system, power mirrors, etc. For example, the body control module 526 includes circuits that drive one or more of relays (e.g., to control wiper fluid, etc.), brushed direct current (DC) motors (e.g., to control power seats, power locks, power windows, wipers, etc.), stepper motors, LEDs, etc. The autonomy unit 528 controls performance of autonomous and/or semi-autonomous driving maneuvers of the vehicle 100 (e.g., for park-assist, remote park-assist, lane-assist, etc.). For example, the autonomy unit 528 performs motive functions based upon, at least in part, image(s) and/or video captured by the cameras 104 and/or data collected by the proximity sensors 102. Further, the camera module 530 controls operation of one or more of the cameras 104 to collect image(s) and/or video. For example, the collect image(s) and/or video are utilized to generate renderings (e.g., of the vehicle 100, of other objects, etc.) for presentation to occupants, presented to occupant(s) of the vehicle 100, and/or utilized to facilitate the autonomy unit 528 in performing autonomous and/or semi-autonomous driving maneuvers.

The vehicle data bus 514 communicatively couples the communication module 106, the onboard computing platform 502, the HMI unit 504, the communication module 506, the communication module 508, the sensors 510, and the ECUs 512. In some examples, the vehicle data bus 514 includes one or more data buses. The vehicle data bus 514 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6A:
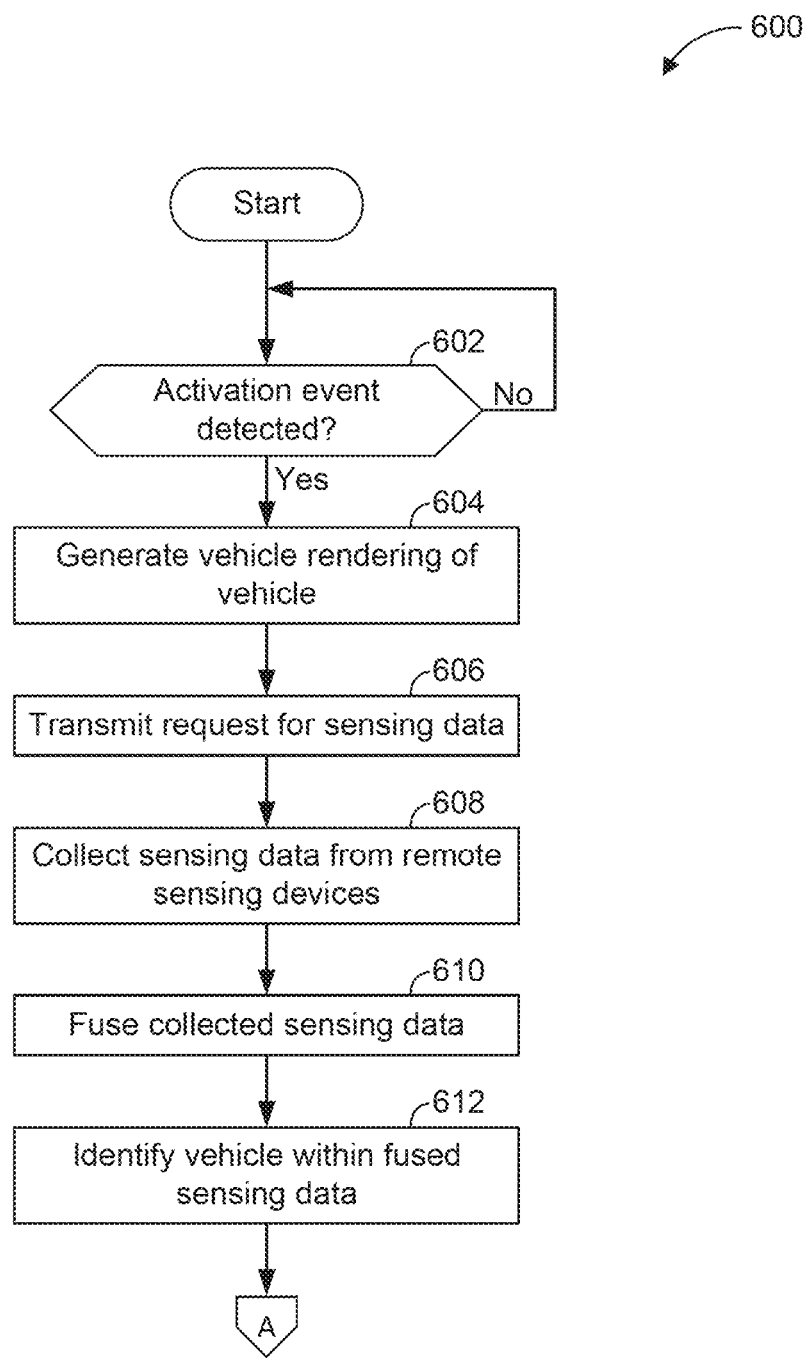
FIGS. 6A-6B is a flowchart for generating and presenting a rendering of a vehicle based on short-range communication in accordance with the teachings herein.
Figure 6B:
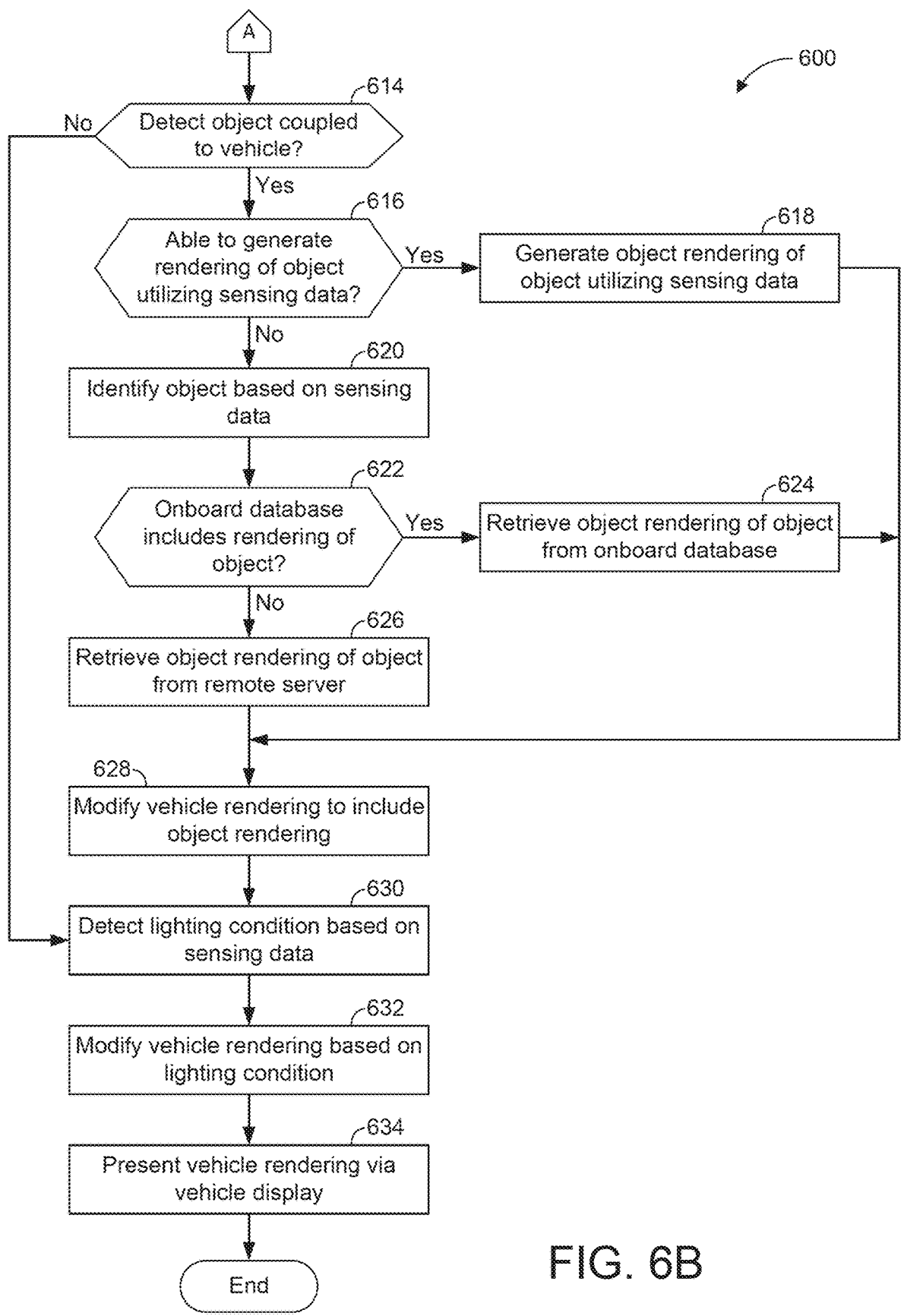

FIGS. 6A-6B are a flowchart of an example method 600 to generate and present a rendering of a vehicle based on short-range communication. The flowchart of FIGS. 6A-6B is representative of machine readable instructions that are stored in memory (such as the memory 518 of FIG. 5) and include one or more programs which, when executed by a processor (such as the processor 516 of FIG. 5), cause the vehicle 100 to implement the example the rendering controller 108 of FIGS. 1 and 5. While the example program is described with reference to the flowchart illustrated in FIGS. 6A-6B, many other methods of implementing the example rendering controller 108 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602 of FIG. 6A, the rendering controller 108 determines whether an activation event has been detected. Example activation events detected by the rendering controller 108 include (i) activation of an engine and/or motor of the vehicle 100, (ii) activation of one or more of the cameras 104 of the vehicle 100, (iii) a transmission of the vehicle 100 being placed in reverse, (iv) receipt of an activation request via a touchscreen (e.g., the display 202) and/or other input device, (v) a passive-entry passive-start event, (vi) a park-assist event, (vii) a key-on event, etc. In response to the rendering controller 108 not detecting an activation event, the method 600 remains at block 602. Otherwise, in response to the rendering controller 108 detecting an activation event, the method 600 proceeds to block 604.

At block 604, the rendering controller 108 generates a vehicle rendering of the vehicle 100. For example, the rendering controller 108 retrieves the vehicle rendering from the database 520 onboard the vehicle 100. At block 606, the rendering controller 108 transmits a request for sensing data via the communication module 106. For example, the communication module 106 transmits the request to adjacent remote sensing device(s) via DSRC and/or C-V2X. At block 608, the rendering controller 108 collected sensing data from one or more remote sensing devices (e.g., one or more of the vehicles 304, the roadside unit 308, a mobile device, a drone, sensing unit(s) of a trailer coupled to the vehicle 100, etc.) via the communication module 106. 106. For example, the communication module 106 collects the sensing data from the remote sensing device(s) via DSRC and/or C-V2X. At block 610, if the sensing data is collected from a plurality of sources, the rendering controller 108 fuses the collected sensing data. At block 612, the rendering controller 108 utilizes image recognition software to identify the vehicle 100 within the fused sensing data.

Turning to FIG. 6B at block 614, the rendering controller 108 detects whether an object (e.g., the bicycle 306, a bike rack, etc.) is coupled to the vehicle 100. For example, the rendering controller 108 utilizes image recognition software to analyze the fused sensing data to identify whether an object is coupled to the vehicle 100. In response to the rendering controller 108 detecting that no object coupled to the vehicle 100, the method 600 proceeds to block 630. Otherwise, in response to the rendering controller 108 detecting that an object is coupled to the vehicle 100, the method 600 proceeds to block 616.

At block 616, the rendering controller 108 determines whether it is able to generate an object rendering of the object utilizing the fused sensing data. For example, the rendering controller 108 is able to generate an object rendering utilizing the fused sensing data if the fused sensing data includes imaging information for each side of the object. In response to the rendering controller 108 determining that it is able to generate an object rendering utilizing the fused sensing data, the method 600 proceeds to block 618 at which the rendering controller 108 generates the object rendering of the object utilizing the fused sensing data. For example, the rendering controller 108 generates the object rendering to match the shape, dimensions, colors, and/or other characteristics of the object coupled to the vehicle 100. Upon completing block 618, the method 600 proceeds to block 628. Otherwise, in response to the rendering controller 108 determining that it is unable to generate an object rendering utilizing the fused sensing data, the method 600 proceeds to block 620 at which the rendering controller 108 identifies the object coupled to the vehicle 100. For example, the rendering controller 108 utilizes image recognition software to analyze the fused sensing data to identify what object is coupled to the vehicle 100.

At block 622, the rendering controller 108 determines whether the database 520 onboard the vehicle 100 includes a rendering of the identified object. For example, if the rendering controller 108 identifies that the object coupled to the vehicle 100 is a bicycle, the rendering controller determines whether the database 520 onboard the vehicle 100 includes a rendering of a bicycle. In response to the rendering controller 108 determining that the database 520 onboard the vehicle 100 includes a rendering of the identified object, the method 600 proceeds to block 624 at which the rendering controller 108 retrieves the object rendering of the identified object from the database 520 onboard the vehicle 100. Upon completing block 618, the method 600 proceeds to block 628. Otherwise, in response to the rendering controller 108 determining that the database 520 onboard the vehicle 100 does not include a rendering of the identified object, the method 600 proceeds to block 626 at which the rendering controller 108 retrieves the object rendering of the identified object from a remote server. For example, the communication module 506 retrieves the object rendering of the identified object from the remote server for the rendering controller 108.

At block 628, the rendering controller 108 modifies the vehicle rendering of the vehicle 100 to include the object rendering of the identified object. For example, the rendering controller 108 modifies the vehicle rendering to include the object rendering such that the size and/or orientation of the object rendering relative to the rendering of the vehicle 100 matches the size and/or orientation of the object relative to the vehicle 100. At block 630, the rendering controller 108 detects a lighting condition of the surrounding area of the vehicle 100 based on the fused sensing data. At block 632, the rendering controller 632 modifies the vehicle rendering based on the detected lighting condition. For example, the rendering controller 108 lightens the vehicle rendering for high-light condition and darkens the vehicle rendering for low-light conditions. At block 634, the rendering controller 108 presents the vehicle rendering via the display 202 of the vehicle 100.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a communication module configured to wirelessly communicate with remote sensing devices, wherein at least one of the remote sensing devices comprises at least one roadside unit and is external to the vehicle, and the at least one of the remote sensing devices and the vehicle are separate;
a display configured to present a vehicle rendering of the vehicle;
a controller configured to:
in response to detecting an activation event, collect sensing data from the at least one roadside unit and the vehicle via the communication module;
determine whether an object is coupled to the vehicle based on the sensing data; and
in response to detecting an object coupled to the vehicle, modify the vehicle rendering to include an object rendering of the object based at least in part on the sensing data, wherein the vehicle rendering is modified based at least in part on a color balance and a white balance; and
an onboard database of renderings, and wherein the controller is configured to retrieve the object rendering from the onboard database upon identifying the object based on the sensing data and upon determining that the controller is unable to generate the object rendering utilizing the sensing data.

2. The vehicle of claim 1, wherein the communication module is a dedicated short-range communication (DSRC) module.

3. The vehicle of claim 1, wherein the communication module is configured to collect the sensing data via vehicle-to-vehicle (V2V) communication or vehicle-to-infrastructure (V2I) communication.

4. The vehicle of claim 1, wherein the sensing data collected via the communication module includes an image captured by a camera at the roadside unit.

5. The vehicle of claim 1, wherein, in response to detecting the activation event, the controller is configured to cause the communication module to transmit a request for the sensing data.

6. The vehicle of claim 1, wherein the display is configured to present at least one of a bird's-eye and a side view of the vehicle rendering.

7. The vehicle of claim 1, wherein the activation event includes activation of at least one of an engine and a motor of the vehicle.

8. The vehicle of claim 1, further including a camera, and wherein the activation event includes activation of the camera.

9. The vehicle of claim 8, wherein the display is a touchscreen and the controller activates the camera in response to receiving a request via the touchscreen.

10. The vehicle of claim 8, wherein the camera is a rearview camera, and wherein the controller activates the rearview camera in response to detecting that a transmission of the vehicle is in reverse.

11. The vehicle of claim 1, wherein the activation event includes a passive-entry passive-start (PEPS) event.

12. The vehicle of claim 1, further including an autonomy unit configured for park-assist, and wherein the activation event includes a park-assist event.

13. The vehicle of claim 1, wherein the controller is configured to fuse the sensing data collected from a plurality of remote sensing devices and determine whether an object is coupled to the vehicle based on the fused sensing data.

14. The vehicle of claim 1, wherein the controller configured to detect a lighting condition based on the sensing data and modify the vehicle rendering based on the lighting condition.

15. The vehicle of claim 1, wherein communication between the communication module and the at least one of the remote sensing devices includes location data, and wherein the controller is configured to identify a location of the vehicle within the sensing data based on the location data.

16. The vehicle of claim 1, wherein the object rendering includes a three-dimensional rendering, and wherein the controller is configured to generate the object rendering utilizing the sensing data.

17. The vehicle of claim 1, further including a second communication module configured to communicate with a remote server, and wherein the controller is configured to retrieve the object rendering from the remote server via the second communication module in response to determining that the onboard database does not include the object rendering.

18. The vehicle of claim 1, wherein the vehicle rendering is further modified based at least in part on at least one of: a direction of light, a color temperature, an intensity histogram, a color histogram, or a hue.

19. A method for a vehicle, comprising:
   detecting, via a processor, an activation event;
   in response to detecting the activation event, generating a vehicle rendering of the vehicle and collecting sensing data from the vehicle and one or more remote sensing devices comprising at least one roadside unit via a communication module, wherein at least one of the one or more remote sensing devices is external to the vehicle, and the at least one of the one or more remote sensing devices and the vehicle are separate;
   determining, via the processor, whether an object is coupled to the vehicle based on the sensing data;
   in response to detecting an object coupled to the vehicle, modifying the vehicle rendering to include an object rendering of the object based at least in part on the sensing data, wherein the vehicle rendering is modified based at least in part on a color balance and a white balance, and wherein a controller is configured to retrieve the object rendering from an onboard database of renderings upon identifying the object based at least in part on the sensing data and upon determining that the controller is unable to generate the object rendering utilizing the sensing data; and
   presenting the vehicle rendering via a display of the vehicle.

\* \* \* \* \*